No. 822,201. PATENTED MAY 29, 1906.
B. A. FISKE.
RANGE FINDER.
APPLICATION FILED SEPT. 27, 1905.
3 SHEETS—SHEET 2.
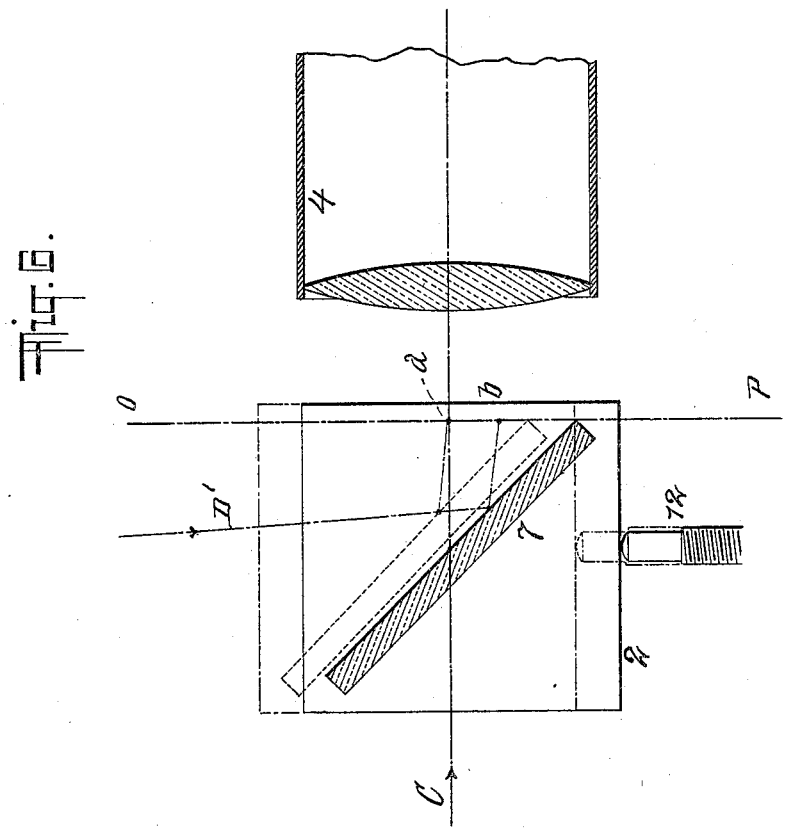
WITNESSES:
INVENTOR
Bradley A. Fiske
BY Park Benjamin
his ATTORNEY No. 822,201. PATENTED MAY 29, 1906.
B. A. FISKE.
RANGE FINDER.
APPLICATION FILED SEPT. 27, 1905.
3 SHEETS—SHEET 3.
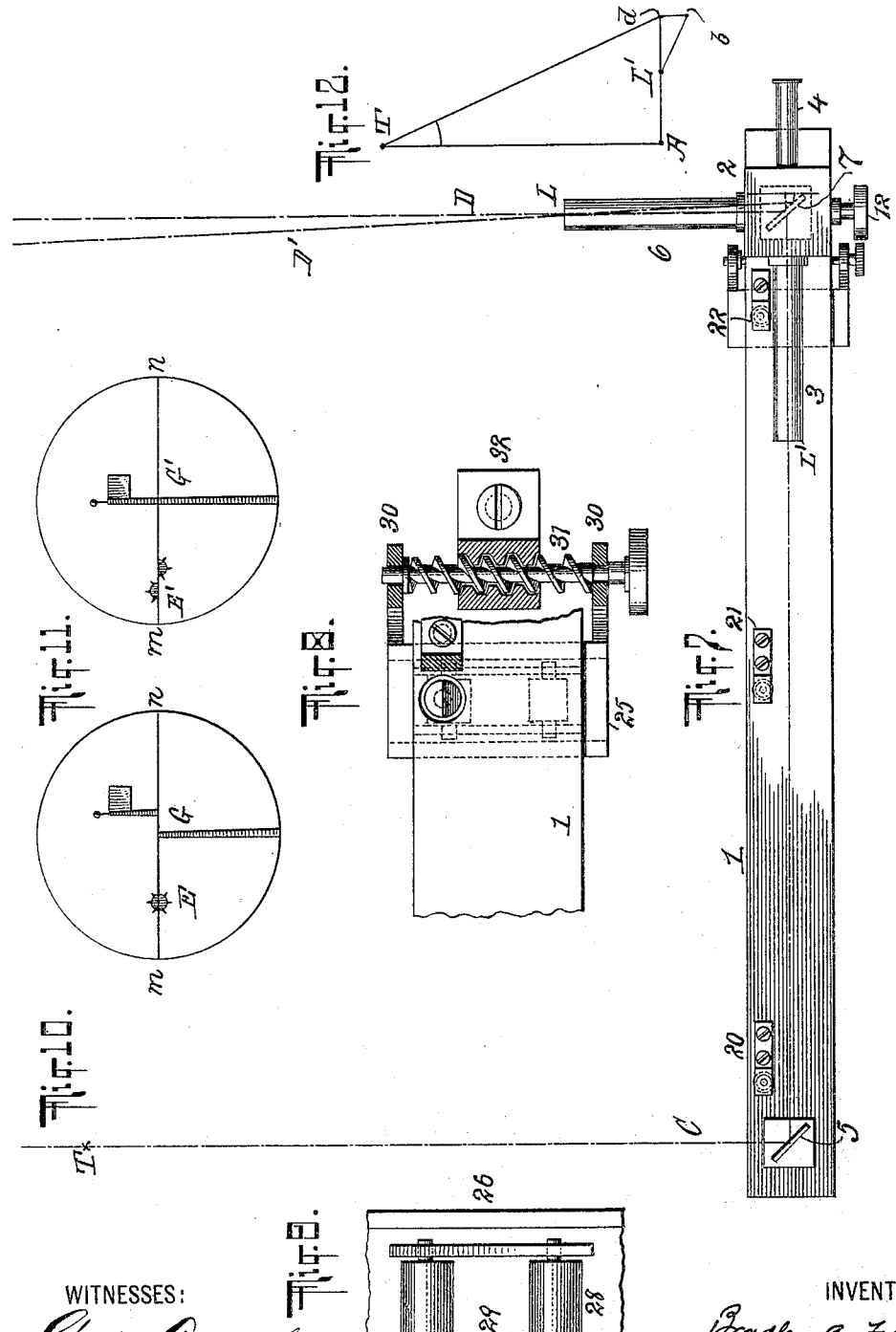
WITNESSES:
INVENTOR
Bradley A. Fiske
BY
his ATTORNEY

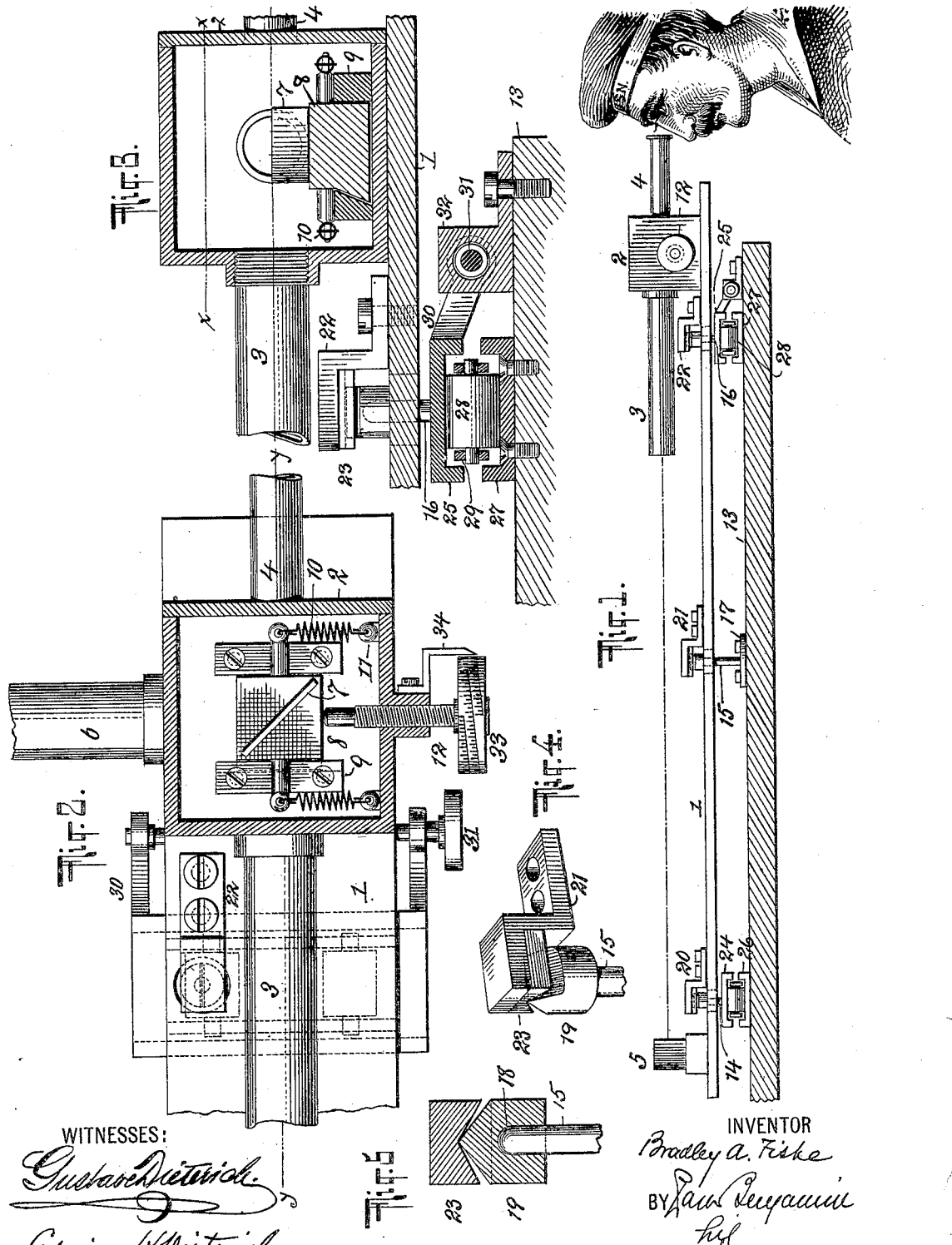

UNITED STATES PATENT OFFICE.

BRADLEY A. FISKE, OF THE UNITED STATES NAVY.

RANGE-FINDER.

No. 822,201.        Specification of Letters Patent.        Patented May 29, 1906.

Application filed September 27, 1905. Serial No. 280,285.

*To all whom it may concern:*

Be it known that I, BRADLEY A. FISKE, of the United States Navy, have invented a new and useful Improvement in Range-Finders, of which the following is a specification.

The principle of my invention consists in establishing a proportional relation between, first, the range to be determined; second, a known base-line on the supporting-bar of the instrument; third, the amount of apparent displacement of the images of the distant object due to the rays diverging therefrom to the ends of the said base-line when said images by reflection and projection are referred to the same focal plane of observation, and, fourth, the focal length of the projecting device.

As is hereinafter explained, the known terms in the proportion are the base-line length and the focal length of the projecting device, and these become a constant in any given instrument. In practice, therefore, it remains only to measure the amount of displacement of the images of the distant object as the same appear in the field of the eyepiece. This is done by a simple mechanical adjustment of a reflector whereby said images are brought into alinement. The observer then reads the measurement on a micrometric scale marked once for all in corresponding terms of range.

It will be apparent that my device is a one-observer range-finder which permits of instant range determination without resort to calculation and that its operation requires no previous special education or manipulative skill beyond that ordinarily required for the handling of any instrument of precision.

As the accuracy of the device depends considerably upon its construction, my invention further consists in certain mechanical features and combinations more particularly recited in the claims, whereby, first, the base-line bar is prevented from deflection or distortion; second, the instrument is equilibrated on a longitudinal axis of the base-line bar; third, the instrument is supported so as to be moved by the application of a very small force; fourth, the instrument may be oscillated on its longitudinal axis of support; fifth, the instrument may be moved on a supporting-pivot over small azimuth angles.

In the accompanying drawings similar numbers and letters of reference indicate like parts.

Figure 1 is a side elevation of the instrument mounted on its base, which may be the top of a turret. Fig. 2 is a horizontal section on the line $x$ $x$ of Fig. 3 of the box in which the telescopes and eyepiece are mounted and which contains the adjustable reflector. Fig. 3 is a vertical section on the line $y$ $y$ of Fig. 2. Fig. 4 is a perspective view showing in detail one of the supports for the base-line bar. Fig. 5 is a section of one of the knife-edge supporting-blocks and beveled plate resting thereon. Fig. 6 is a plan view illustrating the effect of displacement of the adjustable reflector. Fig. 7 is a plan view of the entire instrument. Fig. 8 is a plan view and partial section showing the device for moving the base-line bar over small azimuth angles. Fig. 9 is a plan view of one of the roller-supports of the base-line bar. Figs. 10 and 11 show the images seen in the field of the instrument under conditions hereinafter explained. Fig. 12 is a diagram illustrating trigonometrical relations.

I will first describe the mechanism.

1 is a bar of metal which carries the optical parts of the instrument. As hereinafter explained, an interval between two points on the longitudinal axis of this bar constitutes the base-line in the trigonometrical determination of the range. Near one end of said bar is secured a cubical box 2, and fixed in one wall thereof is a telescope 3. In the opposite wall is secured the eyepiece 4. Near the other end of bar 1 is a reflector 5, which is permanently fixed at an angle to reflect a ray C coming from a distant object T in a right line coincident with the central axes of the telescope 3 and eyepiece 4.

Secured in another wall of box 2 with its central axis at right angles to and intersecting the line joining the axes of telescope 3 and eyepiece 4 is a telescope 6. 7 is a vertical reflector, the reflecting-surface of which is rigorously parallel to the reflecting-surface of reflector 5. In vertical height the reflector 5 extends only to the horizontal plane, which includes the axes of the telescopes 3 and 6. The middle point of its upper edge is normally coincident with the point of intersection of said axes. By reason of this construction all the rays, as C, which reach the eyepiece after reflection from the reflector 5 are above the horizontal diameter $m$ $n$ of the field, Figs. 10 and 11, and all the rays, as D, which are reflected from the reflector 7 are below said diameter. The reflector 7 is adjustable in the direction of the axis of telescope 6. To this end it is mounted on a block 8, Figs. 2 and 3, which slides in dovetail guides 9, secured to the bottom of box 2. On each side of block 8 are projections extending over the guides 9, to which projections are attached the ends of helical springs 10, the opposite ends of said springs being attached to lugs 11 inside the box. The springs 10 hold the block 8 against the end of the adjusting-screw 12, which is received in a threaded boss on the wall of the box opposite to that in which telescope 6 is secured. When the screw 12 is turned inward, the block 8, and hence the reflector 7, is moved toward telescope 6, and when the screw 12 is turned in the opposite direction the block 8, being retracted by springs 10, is moved away from telescope 6.

The bar 1 is designed to be mounted on the top of a platform rotary in a horizontal plane, such as the top of a warship's turret, and to be carried over large azimuth angles by the revolution of said platform. The top plate of such a turret is represented at 13. It is necessary, however, to support said bar so as to realize three objects—viz., first, the maintenance of the bar in a true horizontal plane, or, in other words, the prevention of deflection or distortion; second, movement of the bar in azimuth over short arcs around a center about midway its length; third, oscillation of the bar over small angles around a longitudinal axis.

In order to maintain the bar in true horizontal plane, I suspend it at three points in the following manner: Extending upward from the supporting-platform or turret-top are three vertical posts 14 15 16. The middle post 15 rises from a base 17, bolted to the turret-top, and hence is immovable. The posts 14 and 16 are on movable bases which will be hereinafter described. All three posts pass freely through slots in the bar 1, and each post is rounded at its upper end, as shown at 18, Fig. 5. This rounded extremity is received in a similarly-formed socket in the bottom of a cylindrical block 19, the upper part of which is beveled to a knife-edge, Figs. 4 and 5. The blocks 19 turn freely on their posts. On the upper side of the bar 1 are bolted brackets 20 21 22, which extend over the slots through which pass the posts 14 15 16. On the under side of these brackets are secured inwardly-beveled plates 23, the angle of the bevel in which is greater than the angle of bevel forming the knife-edge. The bar 1 is suspended, as stated, at three points by causing the beveled plates of brackets 20 21 22 to rest upon the knife-edges, and said knife-edges are placed along the longitudinal axis of the bar, upon which axis the bar and parts supported thereby normally balance. Said axis is therefore not in the central line of the bar, but at one side thereof in order to compensate for the weight of the projecting-telescope 6. The posts 14 and 16 are approximately equidistant from the middle post 15. The bar being thus suspended is prevented from deflecting. Because the angle of bevel of plates 23 is greater than the angle of bevel of the received knife-edges of blocks 19 the bar may be oscillated on said knife-edges. The object of permitting such oscillation of the bar is to enable the observer to hold the telescopes in horizontal position and to keep them correctly bearing upon the object despite departure of the base on which the bar is supported from a horizontal plane. Where the base is a turret-top, such departure occurs when the vessel is at sea and rolls or pitches.

The posts 14 and 16 each extend upwardly from downwardly-flanged plates 24 25. Secured beneath said plates and upon the turret-top are upwardly-flanged plates 26 27. Between each pair of plates 24 26 and 25 27 are rollers 28, journaled in side bars 29, Fig. 8. Said rollers permit the bar 1 to be freely turned around the middle post 15 as a center. They are shorter in length than the distance between the flanges on plates 26 27, as shown in Fig. 3.

The object of moving the bar 1 around post 15 as a center is to enable it to be laid parallel with the usual telescopic sights employed with turret-guns, since such sights are sometimes laid with their axes varying slightly in azimuth from the direction of the axes of the guns in order to make certain well-known allowances in sighting not necessary here to explain. The extent of movement of the telescope-sight, and hence the needful extent of movement of the bar 1 around post 15, is small, and the latter is effected and controlled in my present instrument by the following means: Extending rearwardly from the downwardly-flanged plate 25 are two arms 30. A quick-threaded screw 31 is journaled in one of said arms, and its extremity is seated in the other arm. Between said arms and fixed on the turret-top is a nut 32, through which screw 31 passes. By turning said screw in either direction the bar 1 is swung on its pivot 15. The divergence of the path of bodily movement of screw 32 from a straight line during said swinging is permitted by making the threads of screw 31 fit loosely in nut 32.

I will now explain the optical principles involved and the mode of operation of the instrument.

The focal lengths of the object-lens L' of telescope 3 and of object-lens L of telescope 6 are the same. The focal plane common to both telescopes and also to the eyepiece 4 is represented by the line O P, Fig. 6. The base-line is the distance between the middle points of the surfaces of reflectors 5 and 7. In practice this may measure fifteen feet. The distance L' a may be 40.75 inches.

Assume an object—as, for example, as fixed star—so far distant from the instrument as that rays therefrom proceeding to opposite ends of the base-line will be parallel. Rays, as C, reflected from reflector 5 and passing over reflector 7 will become focused at A, Fig. 6. Rays, as D, reflected from reflector 7 will also become focused at the same point $a$. The partial images of the object above and below the horizontal field diameter $m\ n$ will then coincide, and the object or star will appear as at E, Fig. 10. Assume now an object the rays from which in proceeding to the extremities of the base-line diverge and are not parallel—as, for example, one located within the terrestrial horizon—while the rays, as C, from that object proceed as before to the point $a$, Fig. 6. Other rays, as D', are focused after reflection from reflector 7 to the point $b$ distant from $a$ on the focal plane O P. As the angle of divergence between said rays C D' increases the distance between points $b$ and 6 correspondingly augments, or, in other words, the nearer the object approaches to the instrument the greater will be the distance $a\ b$.

It has already been stated that a fixed star (rays parallel) appears in the field as at E, Fig. 10. Let the object be a vessel's mast with flag thereon, which being near sends divergent rays to the ends of the base-line. Then the focal points $a\ b$ being separated, the parts of the object will appear displaced on the horizontal field diameter $m\ n$ by the distance $a\ b$, or as shown at G, Fig. 10, where the upper part of the mast is shown displaced to the right of the lower part by that distance.

Inasmuch as the distance $a\ b$ on the focal plane O P varies inversely as the distance or range of the object from the instrument, it follows that through a determination of $a\ b$ said range or distance of the object can be found. This I accomplish in the following manner: Recurring to Fig. 6, assume the reflector 7 to be moved by its screw 12 until the point $b$ coincides with the point $a$, or, in other words, until the reflector takes the position indicated by the dotted lines. If the instrument were originally sighted upon a fixed star (parallel rays) appearing, as stated, at E, Fig. 10, the result would now be to displace the half-image above the diameter $m\ n$ to the left, or as shown at E, Fig. 11. If, on the other hand, the instrument were originally sighted upon a vessel's mast (diverging rays) appearing, as stated, at G, Fig. 10, the result would be to move the part of the image above the diameter $m\ n$ to the left, as seen through the inverting-eyepiece, and into coincidence with the lower part, as shown at G', Fig. 11. Obviously the extent of movement of reflector 7 to accomplish the last-named result can easily be measured physically by any suitable micrometric device combined with the screw 12, which will show the distance advanced by the screw per rotation and fraction of rotation thereof.

Practically the object-lens L of the telescope 6 may be supposed to lie in the line joining the axes of telescope 3 and eyepiece 4, or, in other words, the length of telescope 6 may be neglected. The focal length of telescope 3 is known, being the distance from its object-lens L' to the focal plane which includes the point $a$. Then if T, Fig. 12, be the position of the object and A the middle point of reflector 5

$$\frac{Aa}{AT} = \frac{ab}{L'a}$$

A T is the range or distance to be ascertained, and therefore equals $$\frac{Aa \times L'a}{ab}$$

As the numerator of the fraction is a constant determinable once for all for a given instrument, it becomes obvious that the screw 12 may be provided with a micrometer cylinder-head 33, marked for ranges corresponding to different displacements of the reflector 7, and that the required range can be read therefrom in the usual way by means of the fixed index 34, Fig. 2.

In establishing the range-scale the infinity-mark is determined by observing a fixed star, for example, any instrumental errors of construction being then corrected by bringing the upper and lower half-images of the object into coincidence, as at E, Fig. 10.

In using the instrument the index 34 is set at the infinity-mark on the scale of cylinder 33, when the parts of the image of the distant object will appear separated, as illustrated at G, Fig. 10. The screw 12 is then turned to move reflector 7 to the right of the observer, which through the reversal of the images by the lenses will cause the upper displaced part of the image to move to the left of Fig. 10 until both parts coincide, as at G', Fig. 11. The scale-reading of the range in yards or meters (shown by the index 34) is then taken.

I claim—

1. Two telescopes disposed at right angles and reflectors associated therewith constructed to project two diverging groups of rays from a distant object to the same focal plane, and means for displacing in said plane the image due to one telescope with respect to the image due to the other telescope.

2. Two telescopes disposed at right angles and reflectors associated therewith constructed to project two diverging groups of rays from a distant object to the same focal plane, and means for moving one of said reflectors and thereby displacing in said plane the image due to one telescope with respect to the image due to the other telescope.

3. Means for producing two partial and separated images of a distant object, reflectors constructed to reflect said images to the same focal plane, and means for bodily moving one of said reflectors to bring one of said partial images into alinement with the other.

4. A support, two telescopes relatively at right angles, a common eyepiece for both of said telescopes, the said telescopes and eyepiece having a common focal plane, and means for displacing on said plane the image formed by one of said telescopes with respect to the image formed by the other telescope.

5. Two telescopes disposed at an angle in the same plane, and having lenses of the same focal length, reflectors associated with said telescopes and constructed to reflect the two partial images of a distant object projected by said telescopes to the same focal plane, and means for displacing in said plane one of said partial images and bringing said image into alinement with the other partial image and thereby forming a complete image.

6. A support, and, located thereon, a telescope, an inclined reflector fixed at a distance from said telescope and in the line of sight thereof, an eyepiece in line with said telescope, an inclined reflector 1 between said telescope and eyepiece 2 parallel to said first-named reflector 3 disposed with reference to the central axis of said telescope 4, and a second telescope 1 at right angles to and 2 having its central axis in the same plane as that of said first telescope; the said eyepiece and telescopes having a common focal plane.

7. In a range-finder, a supporting-bar whereon is established an arbitrary base-line, parallel reflectors on said bar at opposite ends of said base-line, an eyepiece, means for projecting the image of a distant object received by one reflector to the focal plane of said eyepiece, means for projecting another image of said object to the second reflector whereby said image is reflected to the same focal plane, and means for displacing one image until it is alined with the other image.

8. In a range-finder, a supporting-bar, a reflector at one end thereof, a chamber at the other end thereof, a telescope secured in one wall of said chamber and disposed parallel to said bar, an eyepiece secured in the opposite wall of said chamber, a telescope secured in another wall of said chamber and at right angles to said first telescope, a reflector in said chamber located at one side of the plane including the axes of said telescopes and eyepiece, and means for moving said last-named reflector in a path at right angles to the axis of said first-named telescope.

9. In a range-finder, a base, optical members, a bar carrying said members, a central pivot-support for said bar fixed on said base, and end supports for said bar movable on said base; the said supports having rectilinear upper edges disposed in a line parallel to the longitudinal axis of said bar, and the said bar having bearings receiving said edges.

10. In a range-finder comprising an elongated bar and two telescopes carried by said bar, one of said telescopes being parallel to and the other at right angles to said bar, means for supporting and equilibrating said bar on an axis parallel to the axis of said first-named telescope.

11. In a range-finder, a base, optical members, a bar carrying said members and means for supporting said bar on said base; the said supporting means being constructed and arranged to permit said bar to be oscillated on a longitudinal axis independently of said base.

12. In a range-finder, a base, optical members, a bar carrying said members and having openings, supports extending upward from said base and passing through said openings and means on said bar for suspending the same on the upper extremities of said supports.

13. In a range-finder, a base, optical members, a bar carrying said members and having openings, supports extending upward from said base and passing through said openings, means on said bar for suspending the same on the upper extremities of said supports and means for moving said bar in azimuth around one of said supports as a pivot.

14. In combination with and carrying the optical members of a range-finder, a bar and a support having a rectilinear upper edge, on which edge said bar is equilibrated.

15. In a range-finder, optical members, a bar, and a plurality of supports each having a rectilinear upper edge and the said edges being in line; the said bar carrying said optical members and itself carried by and equilibrated on said support edges.

16. In a range-finder, optical members, a bar, a plurality of supports each having a rectilinear upper edge and the said edges being in line; the said bar carrying said optical members and itself carried by and equilibrated on said support edges, and means for moving said bar in azimuth around one of said supports as a pivot.

17. In a range-finder, a bar having a longitudinal groove, optical members carried on said bar, a loose sleeve having at its upper edge a knife-edge constructed to fit in said groove and a rod carrying said sleeve.

In testimony whereof I have signed my name to this specification in the presence of two subscribing witnesses.

BRADLEY A. FISKE.

Witnesses:
 Wm. H. Siegman,
 Park Benjamin, Jr.